United States Patent
Moon et al.

(10) Patent No.: US 8,692,952 B2
(45) Date of Patent: Apr. 8, 2014

(54) LIQUID CRYSTAL DISPLAY DEVICE HAVING A TRANSPARENT PLATE DISPOSED ON BOTH SIDES OF THE LIQUID CRYSTAL PANEL

(75) Inventors: Hong-Man Moon, Gyeongsangbuk (KR); Su-Woong Lee, Gyeongsangbuk (KR); Sang-Yoon Paik, Seoul (KR)

(73) Assignee: LG Display Co., Ltd., Seoul (KR)

(*) Notice: Subject to any disclaimer, the term of this patent is extended or adjusted under 35 U.S.C. 154(b) by 127 days.

(21) Appl. No.: 12/987,818

(22) Filed: Jan. 10, 2011

(65) Prior Publication Data

US 2011/0102703 A1    May 5, 2011

Related U.S. Application Data

(62) Division of application No. 12/007,436, filed on Jan. 10, 2008, now Pat. No. 7,868,966, which is a division of application No. 11/020,172, filed on Dec. 27, 2004, now abandoned.

(30) Foreign Application Priority Data

Apr. 30, 2004  (KR) .............................. 2004-0030383

(51) Int. Cl.
    G02F 1/1335  (2006.01)

(52) U.S. Cl.
    USPC .................................. 349/58; 349/59; 349/60

(58) Field of Classification Search
    USPC ....................................................... 349/58–60
    See application file for complete search history.

(56) References Cited

U.S. PATENT DOCUMENTS

| | | | |
|---|---|---|---|
| 5,150,231 A | | 9/1992 | Iwamoto et al. |
| 5,583,681 A | | 12/1996 | Shioya et al. |
| 5,659,376 A | * | 8/1997 | Uehara et al. ................... 349/58 |
| 5,808,707 A | | 9/1998 | Niibori et al. |
| 6,339,418 B1 | | 1/2002 | Kitagawa |
| 6,411,353 B1 | | 6/2002 | Yarita et al. |
| 6,504,587 B1 | * | 1/2003 | Morishita et al. ............... 349/58 |
| 6,545,733 B2 | | 4/2003 | Kaga et al. |
| 6,776,512 B2 | | 8/2004 | Mori et al. |
| 7,057,681 B2 | | 6/2006 | Hinata et al. |
| 7,619,696 B2 | | 11/2009 | Ota |
| 2007/0268721 A1 | | 11/2007 | Jung et al. |

FOREIGN PATENT DOCUMENTS

| | | |
|---|---|---|
| CN | 2459575 | 11/2001 |
| CN | 1329726 | 1/2002 |
| EP | 1152282 | 7/2001 |
| JP | 3-45525 U | 4/1991 |
| JP | 3-241317 | 10/1991 |
| JP | 8-286204 | 11/1996 |
| JP | 9-113880 | 5/1997 |
| JP | 2001013876 A | 1/2001 |
| JP | 2001-150584 | 6/2001 |
| JP | 2004-184861 | 7/2004 |
| JP | 2009265366 A | 11/2009 |
| KR | 2002-0064290 | 8/2002 |

* cited by examiner

*Primary Examiner* — Phu Vu
(74) *Attorney, Agent, or Firm* — Morgan, Lewis & Bockius LLP

(57) ABSTRACT

A liquid crystal display device (LCD) includes a liquid crystal panel displaying an image; a first transparent plate disposed on the liquid crystal panel; a second transparent plate disposed underneath the liquid crystal panel; a support member supporting the second transparent plate and the liquid crystal panel; and a fixing member disposed on the first transparent plate, the fixing member coupled with the support member to fix the liquid crystal panel and the first and second transparent plates in place, and to protect the liquid crystal panel and the first and second transparent plates.

6 Claims, 4 Drawing Sheets

LIQUID CRYSTAL DISPLAY DEVICE HAVING A TRANSPARENT PLATE DISPOSED ON BOTH SIDES OF THE LIQUID CRYSTAL PANEL

The present invention is a divisional patent application of patent application Ser. No. 12/007,436, filed on Jan. 10, 2008, which claims the benefit of U.S. patent application Ser. No. 11/020,172, filed on Dec. 27, 2004, which claims the benefit of Korean Patent Application No. 2004-0030583, filed in Korea on Apr. 30, 2004, each of which is hereby incorporated by reference.

BACKGROUND OF THE INVENTION

1. Field of the Invention

The present invention relates to a liquid crystal display device, and more particularly, to a liquid crystal display device adapted to prevent deformation due to a bending stress.

2. Discussion of the Related Art

Among the image display devices for displaying image data on screens, a related art cathode ray tube (CRT) has been most widely used. However, because of its size and weight, the related art CRT is inconvenient to use.

Accordingly, slim flat-panel display devices have developed. In spite of a large display areas, the flat-panel display devices are slim in size and can fit in most places. For these reasons, the related art CRT has been actively replaced with flat-panel display devices. Specifically, among the flat-panel display devices, a liquid crystal display device (LCD) has been widely accepted because of the high quality resolution while displaying an image. Especially, in displaying the moving pictures, the LCD has a response time as fast as the related art CRT.

The LCD is driven by an optical anisotropy and polarization of liquid crystal material. Since the liquid crystal molecules are thin and long in size, direction of liquid crystal material arrangement is controlled by applying an electric field to the liquid crystal material having directionality and polarity. Accordingly, when the alignment direction is controlled, the optical anisotropy of the liquid crystal material causes the light to be transmitted or blocked depending on the arrangement direction of the liquid crystal material. In this manner, the color and image are displayed.

An active matrix LCD (AMLCD) includes active elements arranged in pixels having a matrix configuration. The AMLCD controls the operation of the pixels using the switching characteristic of the active elements, thereby implementing the memory function through the electro-optic effect. Meanwhile, the LCD is a passive display device that does not have its own light source. Therefore, the LCD requires a lamp, a light guide plate, a sheet and other suitable parts.

FIG. 1 is an exploded perspective view of a related art LCD. Referring to FIG. 1, a backlight assembly supplies light to a liquid crystal panel 120.

An edge type backlight assembly includes a light source 140 for emitting light, a reflection plate 170 for reflecting the light emitted from the light source 140 in upward, a light guide plate 160 for guiding the reflected light, and a diffusion plate 130 for diffusing the guided light. Also, the backlight assembly further includes a lamp housing 150 for supporting the light source 140 and reflecting the emitted light toward the light guide plate 160. The LCD 100 further includes a top case 110, a main support 180 and a bottom cover 190, which protect and support the liquid crystal panel 120.

Although an edge type backlight assembly is described herein, a direct type backlight assembly having a plurality of light sources disposed underneath the liquid crystal panel is also widely accepted. Recently, large-sized LCD models of 60 inches or more have been developed. As the size of the LCD increases, the following problems arise.

The liquid crystal panel of increased-size leads to an extra stress being applied to the liquid crystal panel. This stress is produced by deformation of the liquid crystal panel due to bending and interference between mechanical parts (for example, the top case, the main support, the bottom cover, and other relevant parts). As the stress is applied to the liquid crystal panel, touch brightness non-uniformity occurs in the LCD and light leakage occurs around the edge portion.

SUMMARY OF THE INVENTION

Accordingly, the present invention is directed to a liquid crystal display device (LCD) that substantially obviates one or more of the problems due to limitations and disadvantages of the related art.

An object of the present invention is to provide an LCD capable of maintaining an image quality.

Additional features and advantages of the invention will be set forth in the description which follows, and in part will become apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD includes a liquid crystal panel displaying an image; a transparent plate disposed on the liquid crystal panel; a support member supporting the liquid crystal panel; and a fixing member disposed on the transparent plate, the fixing member coupled with the support member to fix the liquid crystal panel and the transparent plate in place, and to protect the liquid crystal panel and the transparent plate.

In another aspect, the LCD includes a liquid crystal panel displaying an image; a transparent plate disposed underneath the liquid crystal panel; a support member disposed underneath the transparent plate to support the transparent plate and the liquid crystal panel; and a fixing member disposed on the liquid crystal panel, the fixing member coupled with the support member to fix the liquid crystal panel and the transparent plate in place, and to protect the liquid crystal panel and the transparent plate.

In another aspect, the LCD includes a liquid crystal panel displaying an image; a first transparent plate disposed on the liquid crystal panel; a second transparent plate disposed underneath the liquid crystal panel; a support member disposed underneath the second transparent plate to support the second transparent plate and the liquid crystal panel; and a fixing member disposed on the first transparent plate, the fixing member coupled with the support member to fix the liquid crystal panel and the first and second transparent plates in place, and to protect the liquid crystal panel and the first and second transparent plates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention provides an LCD that improves a picture quality by preventing a liquid crystal panel from deformation of the panel due to a bending stress. The preferred embodiments of the present invention will now be described in detail with reference to the accompanying drawings.

Figure 1:
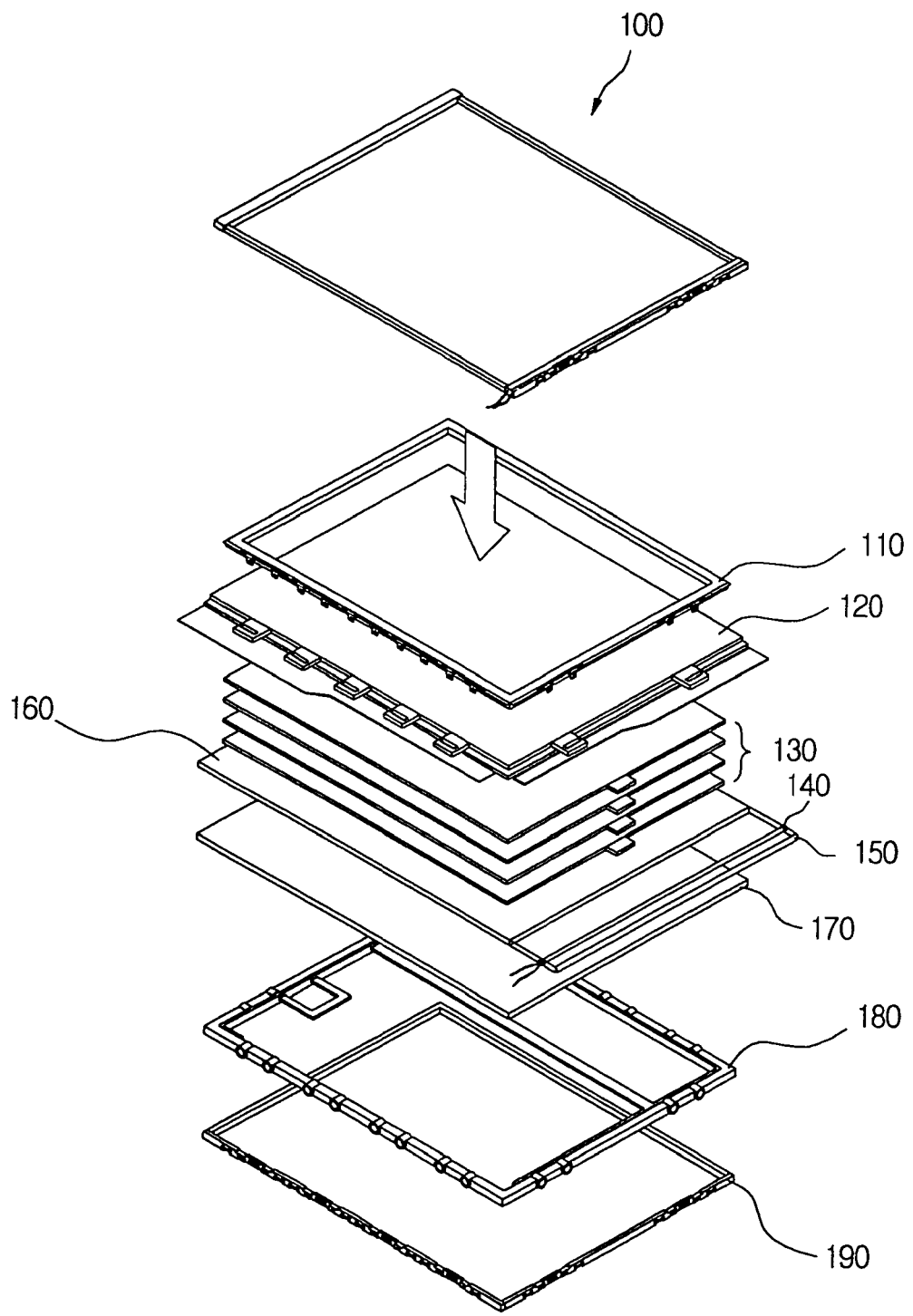
FIG. 1 is an exploded perspective view of a related art LCD.
Figure 2:
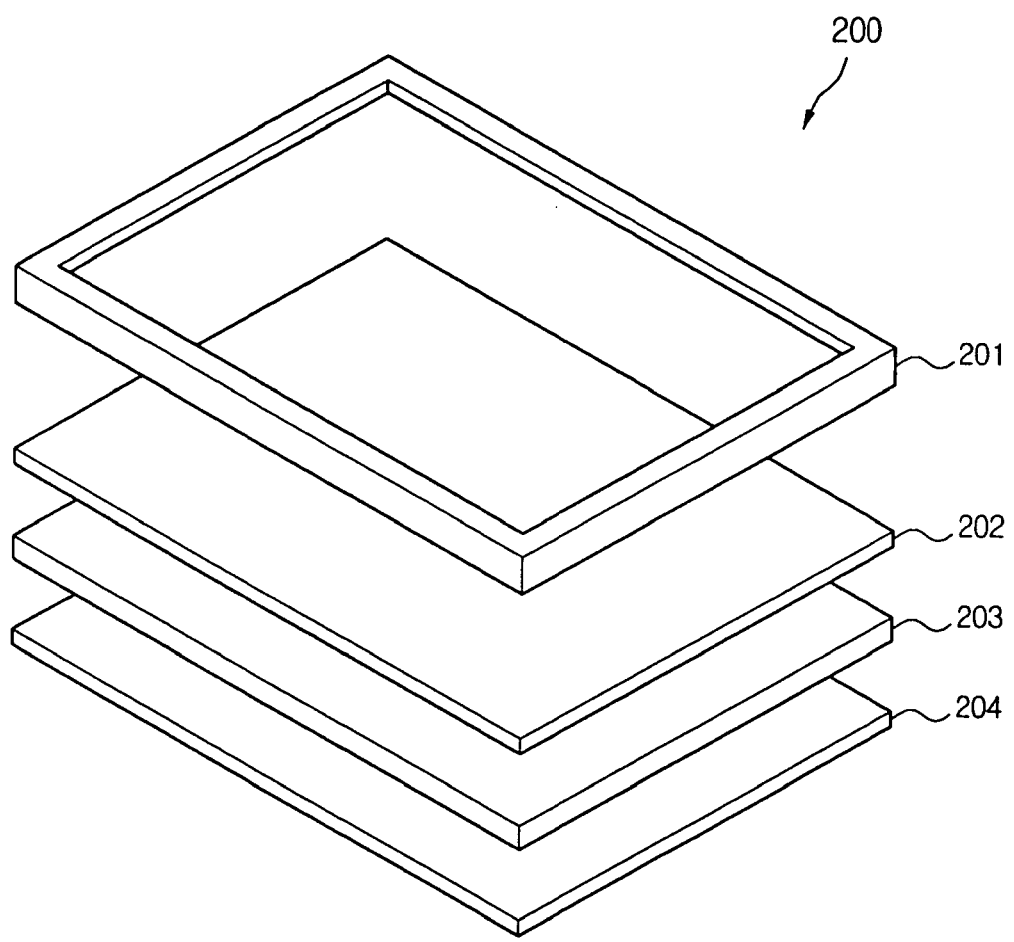
FIG. 2 is a conceptual view illustrating a structure of an LCD according to a first exemplary embodiment of the present invention.

FIG. 2 is a conceptual view illustrating a structure of an LCD according to a first exemplary embodiment of the present invention.

Referring to FIG. 2, an LCD 200 according to a first exemplary embodiment of the present invention includes a liquid crystal panel 203 displaying an image and a transparent plate 202 disposed on the liquid crystal panel 203. The LCD 200 further includes a support member 204 and a fixing member 201. The support member 204 supports the liquid crystal panel 202. The fixing member 201 is disposed on the transparent member 204 and coupled to the support member 204, such that the liquid crystal panel 203 and the transparent plate 202 are fixed in place and protected.

The fixing member 201 may be in a form of a top case or in the other form, and the support member 204 may be in a form of a main support, a bottom cover or in the other form. The fixing member 201 and the support member 204 can be modified in various manners, depending on the selection of the elements of the LCD. In addition, the fixing member 201 and the support member 204 can be modified depending on the presence or shape of a backlight assembly.

Although not shown, the LCD 200 may further include a backlight assembly for supplying light to the liquid crystal panel 203. Furthermore, the backlight assembly may employ a direct type backlight assembly or an edge type backlight assembly. The backlight assembly is disposed underneath the liquid crystal panel 203.

Furthermore, the liquid crystal panel 203 includes a liquid crystal layer interposed between a first substrate and a second substrate. Polarizers may be attached to an upper portion of the first substrate and a lower portion of the second substrate. In general, a color filter layer and a common electrode are formed on the first substrate, and a switching element and a pixel electrode are formed on the second substrate. The liquid crystal panel 203 can be formed using a color filter on TFT (COT) structure or a TFT on color filter (TOC) structure.

The liquid crystal panel 203 can be implemented in various types, including a reflective type, a transmissive type, and a semi-transmissive type. In addition, the liquid crystal panel 203 is further implemented in various modes, including a Twisted Nematic (TN) mode, an In Plane Switching (IPS) mode and a Vertical Alignment (VA) mode.

Meanwhile, the LCD 200 of the present invention includes that the transparent plate 202 is disposed on the liquid crystal panel 203. The transparent plate 202 protects the liquid crystal panel 203 and prevents the liquid crystal panel 203 from being directly exposed to an outside. At this time, since the transparent plate 202 is formed of material having a predetermined hardness, the liquid crystal panel 203 is prevented from being deformed due to its own weight or an external pressure.

According to the present invention, since the liquid crystal panel 203 is prevented from being deformed due to its own weight or an external force, it is possible to prevent the occurrence of touch brightness non-uniformity in the liquid crystal panel. The touch brightness non-uniformity is defined that an initial black state becomes un-uniform due to an unbalanced panel weight distribution when an external force is applied to the liquid crystal panel in a black mode.

As the size of the liquid crystal panel 203 increases, it is more difficult to control the touch brightness non-uniformity. However, the present invention targets to solve the above problem by providing the transparent plate 202 on the liquid crystal panel 203. Specifically, the present invention is effective in an LCD having an increased-size liquid crystal panel of 60 inches or more.

Also, the present invention is more effective when implemented in an LCD having an ISP mode liquid crystal panel, compared with an LCD having a VA mode liquid crystal panel. This results from the characteristic of the IPS mode using a horizontal electric field. The IPS mode liquid crystal panel has a tendency that it is affected more by the deformation due to a bending stress.

According to the present invention, the transparent plate 202 having the predetermined hardness is disposed between the liquid crystal panel 203 and the fixing member 201, thereby preventing the deformation of liquid crystal panel 203 by the bending stress. Consequently, light leakage around the edge portion can be reduced. The light leakage is defined that light leaks toward a periphery of the liquid crystal panel 203 due to the deformation of the liquid crystal panel 203 by the bending stress.

Furthermore, the present invention improves an amount of liquid crystal material margin used during the manufacturing process of the liquid crystal panel. In designing a cell, the amount of liquid crystal material is determined by cell gaps given consideration to an electro optic property, shapes of a TFT array, and a color filter array inside the liquid crystal panel. An "amount of liquid crystal" period satisfying the design condition, is called "amount of liquid crystal" margin.

Meanwhile, in the case of an increased-size liquid crystal panel, if the amount of the liquid crystal increases to prevent the touch brightness non-uniformity, the "amount of liquid crystal" margin decreases. However, the present invention can solve the touch brightness non-uniformity using the transparent plate. Accordingly, it is possible to extend the "amount of liquid crystal" period that satisfies the design condition.

Figure 3:
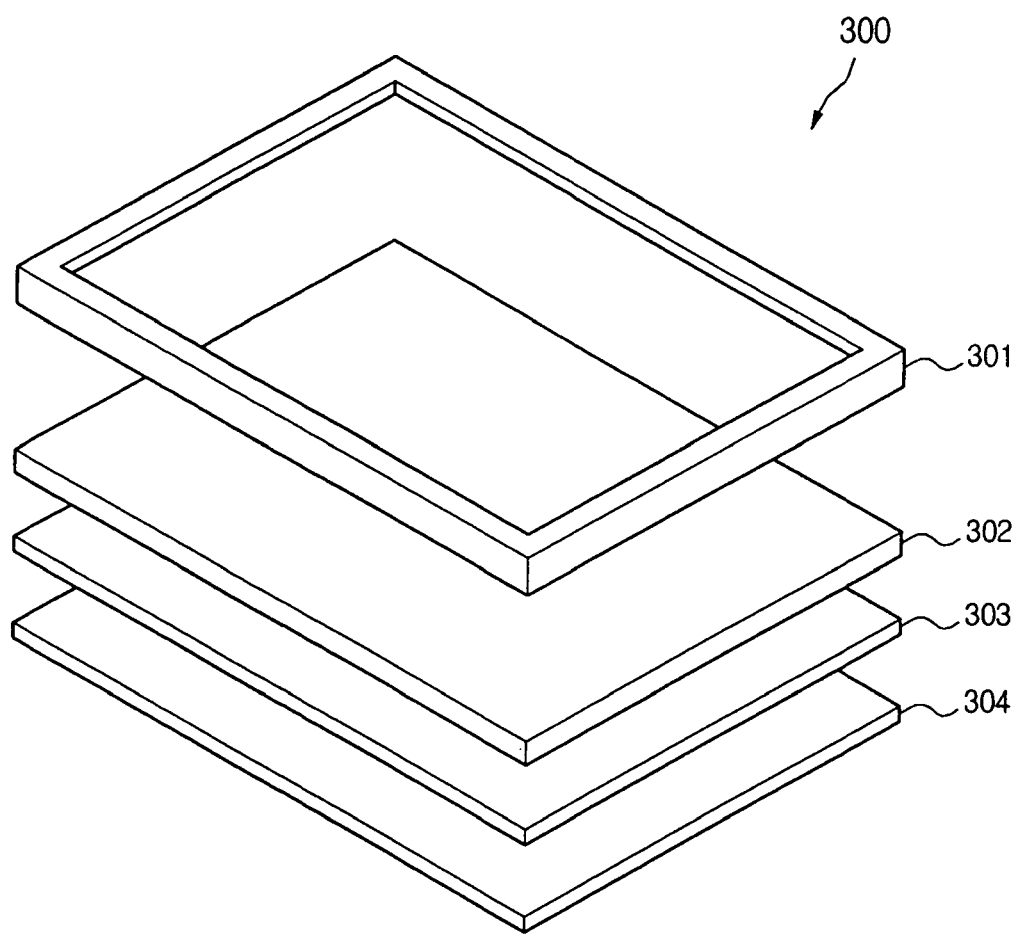
FIG. 3 is a conceptual view illustrating a structure of an LCD according to a second exemplary embodiment of the present invention.

FIG. 3 is a conceptual view illustrating a structure of an LCD according to a second exemplary embodiment of the present invention.

Referring to FIG. 3, an LCD 300 according to a second exemplary embodiment of the present invention includes a liquid crystal panel 302 displaying an image and a transparent plate 303 disposed underneath the liquid crystal panel 302. The LCD 300 further includes a support member 304 and a fixing member 301. The support member 304 is disposed underneath the transparent plate 303 and supports both the transparent plate 303 and the liquid crystal panel 302. Furthermore, the fixing member 301 is disposed on the liquid crystal panel 302. The fixing member 301 is coupled to the support member 304, such that the liquid crystal panel 302 and the transparent plate 303 are fixed in place and protected.

The fixing member 301 may be in a form of a top case or in the other form, and the support member 304 may be in a form of a main support, a bottom cover or in the other form. The fixing member 301 and the support member 304 are adapted to be modified in various manners, depending on the selection of the elements of the LCD. Furthermore, the fixing member 301 and the support member 304 are adapted to be modified depending on the presence or shape of a backlight assembly.

Although not shown, the LCD 300 may further include a backlight assembly for supplying light to the liquid crystal panel 302. In addition, the backlight assembly may employ either a direct type backlight assembly or an edge type backlight assembly. The backlight assembly is disposed underneath the liquid crystal panel 302.

Although not shown, the liquid crystal panel 302 includes a liquid crystal layer interposed between a first substrate and a second substrate. Polarizers may be attached to an upper portion of the first substrate and a lower portion of the second substrate. In general, a color filter layer and a common electrode are formed on the first substrate, and a switching element and a pixel electrode are formed on the second substrate. The liquid crystal panel 302 can be by either a color filter on TFT (COT) structure or a TFT on color filter (TOC) structure.

The liquid crystal panel 302 is adapted to be implemented in various types, including a reflective type, a transmissive type and a semi-transmissive type. Furthermore, the liquid crystal panel 302 is adapted to be implemented in various modes, including a Twisted Nematic (TN) mode, an In Plane Switching (IPS) mode and a Vertical Alignment (VA) mode.

Meanwhile, the LCD 300 of the present invention is characterized in that the transparent plate 303 is disposed underneath the liquid crystal panel 302. The transparent plate 303 removes a mechanical gap between the support member 304 and the liquid crystal panel 302. At this time, since the transparent plate 303 is formed of material having a predetermined hardness, the liquid crystal panel 302 is prevented from being deformed due to its own weight or a pressure applied by the mechanical gap between the support member 304 and the liquid crystal panel 302. Accordingly, the occurrence of touch brightness non-uniformity in the liquid crystal panel can be prevented.

As the size of the liquid crystal panel 302 increases, it becomes more difficult to control the touch brightness non-uniformity. However, the present invention manages the above problem by providing the transparent plate 303 disposed underneath the liquid crystal panel 302. Specifically, the present invention is effective when implemented in an LCD having an increased-size liquid crystal panel of 60 inches or more.

The present invention further provides better control over the touch brightness non-uniformity in an LCD having an ISP mode liquid crystal panel as compared with an LCD having a VA mode liquid crystal panel. This results from the electrical characteristic of the IPS mode using a horizontal electric field, because the IPS mode liquid crystal panel is affected more by the deformation due to bending stress.

According to the present invention, the transparent plate 303 having the predetermined hardness is disposed between the liquid crystal panel 302 and the support member 304, thereby preventing the liquid crystal panel 302 from deformation due to bending stress. Consequently, light leakage around the edge portion can be reduced.

Further, the present invention improves an amount of liquid crystal used during the manufacturing process of the liquid crystal panel. In designing a cell, the amount of liquid crystal material is determined by cell gaps given consideration to an electro optic property, shapes of a TFT array, and a color filter array inside the liquid crystal panel. An "amount of liquid crystal" period satisfying the design condition, is called an "amount of liquid crystal" margin.

Meanwhile, with an increased-size liquid crystal panel, if the amount of the liquid crystal material increases to control the touch brightness non-uniformity, the "amount of liquid crystal" margin decreases. However, the present invention can manage the touch brightness non-uniformity by the transparent plate. Accordingly, it is possible to extend the "amount of liquid crystal" period satisfying the design condition.

Figure 4:
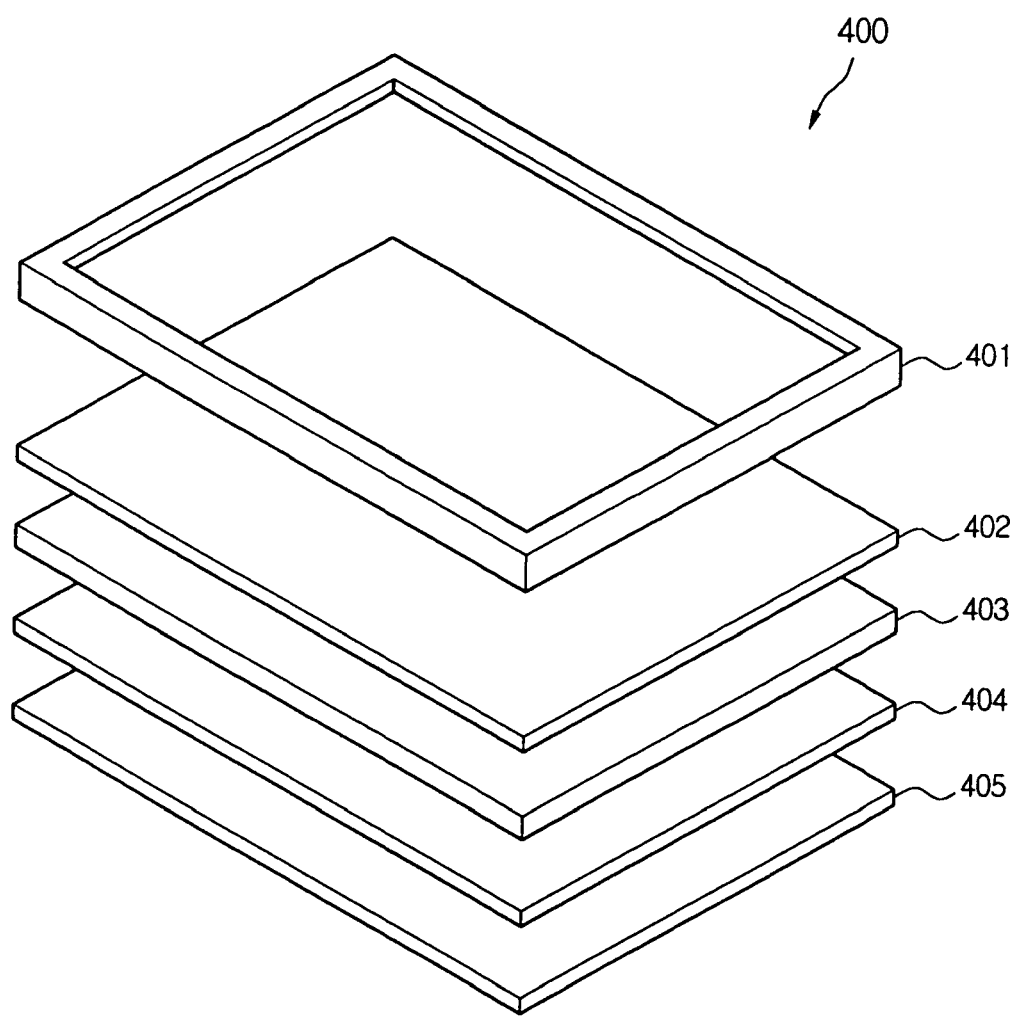
FIG. 4 is a conceptual view illustrating a structure of an LCD according to a third exemplary embodiment of the present invention.

FIG. 4 is a conceptual view illustrating a structure of an LCD according to a third exemplary embodiment of the present invention.

Referring to FIG. 4, an LCD 400 according to a third exemplary embodiment of the present invention includes a liquid crystal panel 403 displaying an image, a first transparent plate 402 disposed on the liquid crystal panel 403, and a second transparent plate 404 disposed underneath the liquid crystal panel 403. The LCD 400 further includes a support member 405 and a fixing member 401.

The support member 405 is disposed underneath the second transparent plate 404 and supports the second transparent plate 404 and the liquid crystal panel 403. The fixing member 401 is disposed on the first transparent plate 402. The fixing member 401 is coupled to the support member 405 such that the liquid crystal panel 403 and the first and second transparent plates 402 and 404 are fixed in place and protected.

The fixing member 401 may be in a form of a top case or in the other form, and the support member 405 may be in a form of a main support, a bottom cover or in the other form. The fixing member 401 and the support member 405 are adapted to be modified in various manners, depending on the selection of the elements of the LCD. Also, the fixing member 401 and the support member 405 are adapted to be modified depending on the presence or shape of a backlight assembly.

Although not shown, the LCD 400 may further include a backlight assembly for supplying light to the liquid crystal panel 403. The backlight assembly may employ either a direct type backlight assembly or an edge type backlight assembly. The selected backlight assembly is disposed underneath the liquid crystal panel 403.

Although not shown, the liquid crystal panel 403 includes a liquid crystal layer interposed between a first substrate and a second substrate. Polarizers may be attached to an upper portion of the first substrate and a lower portion of the second substrate. In general, a color filter layer and a common electrode are formed on the first substrate, and a switching element and a pixel electrode are formed on the second substrate. The liquid crystal panel 403 can be formed by either a color filter on TFT (COT) structure or a TFT on color filter (TOC) structure.

The liquid crystal panel 403 is adapted to be implemented in various types, including a reflective type, a transmissive type, and a semi-transmissive type. Furthermore, the liquid crystal panel 403 is adapted to be implemented in various modes, including a Twisted Nematic (TN) mode, an In Plane Switching (IPS) mode and a Vertical Alignment (VA) mode.

Meanwhile, the LCD 400 of the present invention includes that the first and second transparent plates 402 and 404 are respectively disposed on and underneath the liquid crystal panel 403. The first transparent plate 402 protects the liquid crystal panel 403 and prevents the liquid crystal panel 403 from being directly exposed to an outside. At this time, since the first transparent plate 402 is formed of material having a predetermined hardness, the liquid crystal panel 403 is prevented from being deformed due to its own weight or an external pressure.

In addition, the second transparent plate 404 removes a mechanical gap between the support member 405 and the liquid crystal panel 403. Accordingly, the liquid crystal panel 403 is prevented from deformation due to its own weight or a pressure applied by the mechanical gap between the support member 405 and the liquid crystal panel 403.

The present invention provides more stable protection for the liquid crystal panel 403 from deformation. Accordingly, it is possible to prevent the occurrence of touch brightness non-uniformity in the liquid crystal panel.

As the size of the liquid crystal panel 403 increases, it becomes more difficult to control the touch brightness non-uniformity. However, the present invention can manage the above problem by providing the first and second transparent plates 402 and 404 on and underneath the liquid crystal panel 403. Specifically, the present invention is effective when implemented in an LCD having an increased-size liquid crystal panel of 60 inches or more.

In addition the present invention further provides better control over the touch brightness non-uniformity LCD having an ISP mode liquid crystal panel, compared with an LCD having a VA mode liquid crystal panel. This results from the electrical characteristic of the IPS mode using horizontal electric field, because the IPS mode liquid crystal panel is affected more by the deformation due to the bending stress.

According to the present invention, the first transparent plate 402 having the predetermined hardness is disposed between the liquid crystal panel 403 and the fixing member 401, and the second transparent plate 404 having the predetermined hardness is disposed between the liquid crystal panel 403 and the support member 405, thereby preventing the liquid crystal panel 403 from being deformed. Consequently, light leakage around the edge portion can be reduced.

Furthermore, the present invention can improve an amount of liquid crystal material margin used during the process of manufacturing the liquid crystal panel. In designing a cell, an amount of liquid material crystal is determined by cell gaps given consideration to an electro optic property, shapes of a TFT array, and a color filter array inside the liquid crystal panel. An "amount of liquid crystal" period of a region, which can satisfy the design condition, is called an "amount of liquid crystal" margin.

Meanwhile, in the case of an increased-size liquid crystal panel, if the amount of the liquid crystal increases to control the touch brightness non-uniformity, the "amount of liquid crystal" margin decreases. However, the present invention can manage the touch brightness non-uniformity using the transparent plate. Accordingly, it is possible to extend the "amount of liquid crystal" period satisfying the design condition.

As described above, the LCD according to the present invention improves the image quality by preventing the deformation of the liquid crystal panel due to the bending stress. In addition, the LCD according to the present invention reduces the touch brightness non-uniformity, thereby preventing the light leakage around the edge portion. Moreover, the LCD according to the present invention extends the "amount of liquid crystal" period.

It will be apparent to those skilled in the art that various modifications and variations can be made in the liquid crystal display device (LCD) of the present invention, without departing from the spirit or scope of the invention. Thus, it is intended that the present invention cover the modifications and variations of this invention provided they come within the scope of the appended claims and their equivalents.

What is claimed is:

1. An LCD, comprising:
   a liquid crystal panel displaying an image;
   a first transparent plate disposed on the liquid crystal panel;
   a second transparent plate disposed below the liquid crystal panel;
   a support member disposed below the second transparent plate to support the second transparent plate and the liquid crystal panel; and
   a fixing member disposed on the first transparent plate, the fixing member being coupled to the support member to fix and protect the liquid crystal panel and the first and second transparent plates,
   wherein the fixing member covers four edge potions of the first transparent plate,
   wherein the fixing member is contacted face to face with the four edge potions of the first transparent plate, and
   wherein a lower surface of the first transparent plate is fully contacted face to face with a upper surface of the liquid crystal panel.

2. The LCD according to claim 1, wherein the liquid crystal panel is one of a TN (Twisted Nematic) mode, an IPS (In Plane Switching) mode and a VA (Vertical Alignment) mode.

3. The LCD according to claim 1, further comprising a backlight assembly disposed below the liquid crystal panel, for supplying light to the liquid crystal panel.

4. The LCD according to claim 3, wherein the backlight assembly is a direct type.

5. The LCD according to claim 3, wherein the backlight assembly is an edge type.

6. The LCD according to claim 1, wherein the liquid crystal panel comprises:
   a first substrate;
   a second substrate spaced apart from the first substrate by a predetermined distance;
   a liquid crystal layer disposed between the first substrate and the second substrate;
   a first polarizer attached on the first substrate; and
   a second polarizer attached below the second substrate.

* * * * *